(12) United States Patent
Mori et al.

(10) Patent No.: US 10,928,615 B2
(45) Date of Patent: Feb. 23, 2021

(54) LASER PROCESSING DEVICE HAVING APPROACH FUNCTION OF PROCESSING HEAD

(71) Applicant: FANUC CORPORATION, Yamanashi (JP)

(72) Inventors: Atsushi Mori, Yamanashi (JP); Tatsuya Mochizuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 105 days.

(21) Appl. No.: 15/416,609

(22) Filed: Jan. 26, 2017

(65) Prior Publication Data

US 2017/0219808 A1 Aug. 3, 2017

(30) Foreign Application Priority Data

Jan. 29, 2016 (JP) .............................. JP2016-015487

(51) Int. Cl.
*G02B 19/00* (2006.01)
*B23K 26/08* (2014.01)
*B23K 26/064* (2014.01)

(52) U.S. Cl.
CPC ........ *G02B 19/0047* (2013.01); *B23K 26/064* (2015.10); *B23K 26/0869* (2013.01); *B23K 26/0892* (2013.01); *G02B 19/0014* (2013.01)

(58) Field of Classification Search
CPC ............ G02B 19/0047; G02B 19/0014; B23K 26/064; B23K 26/0869; B23K 26/0892; B23K 26/0876; B23K 26/0648; B23K 26/0884

USPC ............ 219/121.73, 121.75, 121.78, 121.83, 219/121.79
See application file for complete search history.

(56) References Cited

U.S. PATENT DOCUMENTS

| 8,890,028 | B2 | 11/2014 | Mori | |
|---|---|---|---|---|
| 2007/0193984 | A1* | 8/2007 | Kawai | B23K 26/046 219/121.63 |
| 2008/0251506 | A1* | 10/2008 | Atsumi | B23K 26/0057 219/121.72 |

(Continued)

FOREIGN PATENT DOCUMENTS

| CN | 102430858 A | 5/2012 |
|---|---|---|
| CN | 202317434 U | 7/2012 |
| CN | 103862166 A | 6/2014 |

(Continued)

*Primary Examiner* — Tu B Hoang
*Assistant Examiner* — Alba T Rosario-Aponte
(74) *Attorney, Agent, or Firm* — RatnerPrestia

(57) ABSTRACT

A laser processing device configured to generally vertically irradiate a laser beam to a workpiece, and having a function for reducing an adverse effect due to a reflected laser beam from the workpiece. The laser processing device includes: a light condensing point moving part configured to move a focal point in an optical axis direction while irradiating the laser beam, by moving at least one of a processing head, an optical component of a light condense optical system, and a workpiece; and a light condensing point distance setting part configured to set a light condensing point distance between the light condensing point and a workpiece surface when the laser beam is started to be irradiated, wherein the light condensing point distance is set so that an amount of the reflected laser beam returned to the processing head through the optical system is not more than an allowable value.

8 Claims, 7 Drawing Sheets

(56) References Cited

U.S. PATENT DOCUMENTS

2011/0238215 A1* 9/2011 Yanagawa .............. G05B 19/42
                                                              700/258
2013/0126492 A1* 5/2013 Mori ...................... B23K 26/00
                                                              219/121.83

FOREIGN PATENT DOCUMENTS

| CN | 103962734 | A |   | 8/2014  |            |
|----|-----------|---|---|---------|------------|
| JP | 62-289387 | A |   | 12/1987 |            |
| JP | 08001361  | A | * | 1/1996  |            |
| JP | 11129084  | A | * | 5/1999  |            |
| JP | 3154176   | B |   | 4/2001  |            |
| JP | 2002346783| A | * | 12/2002 | B23K 26/046 |
| JP | 2010052014| A | * | 3/2010  |            |
| JP | 5100833   | B |   | 12/2012 |            |
| JP | 2013107089| A |   | 6/2013  |            |

* cited by examiner

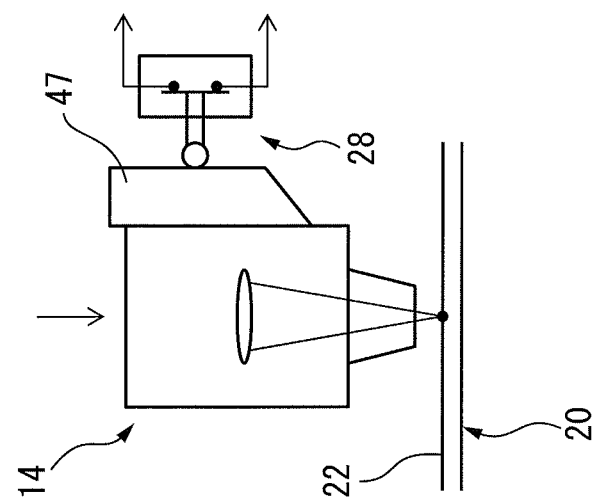
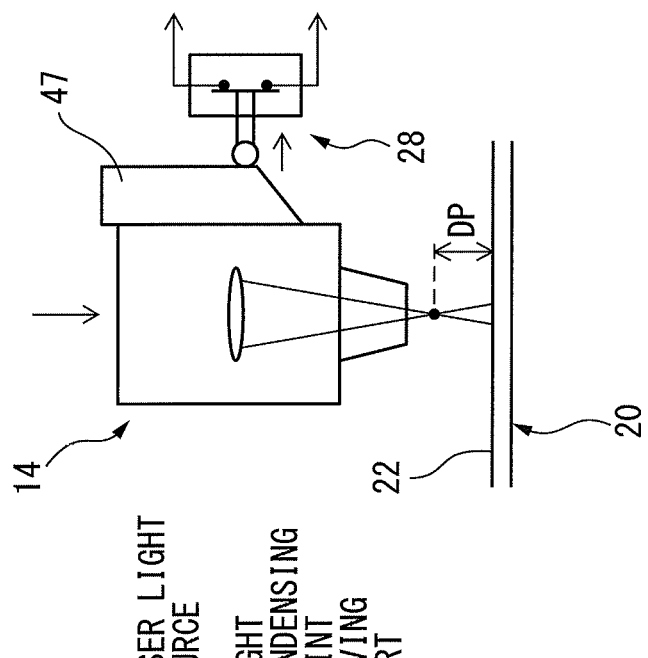
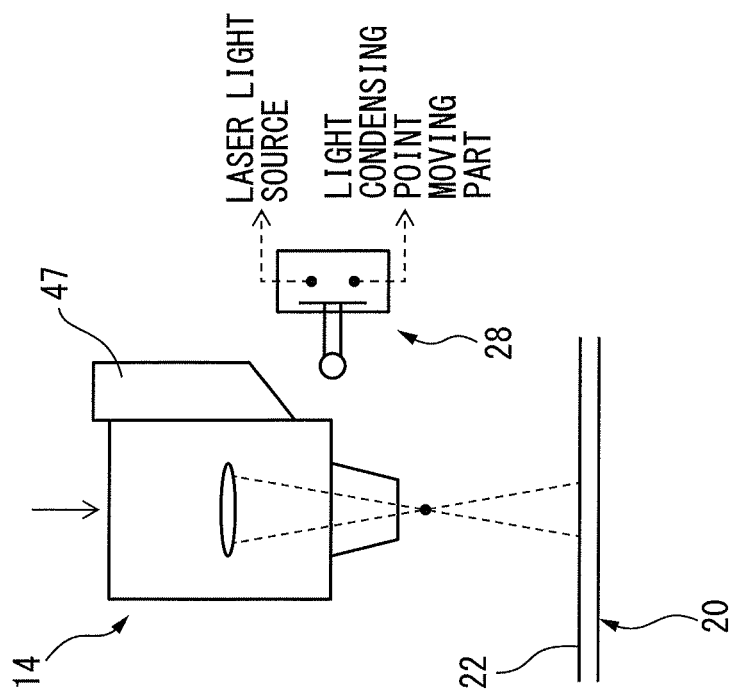

LASER PROCESSING DEVICE HAVING APPROACH FUNCTION OF PROCESSING HEAD

BACKGROUND OF THE INVENTION

1. Field of the Invention

The present invention relates to a laser processing device having a function for irradiating a laser beam to an article to be processed, and approaching a processing head relative to the article.

2. Description of the Related Art

In the prior art, when laser processing is carried out by irradiating a laser beam onto an article to be processed (or a workpiece) such as a metal material, a welding quality of the laser processing may be improved by utilizing a reflected beam from the workpiece. For example, JP 3154176 B discloses a focal position controller configured to successively detect a reflected laser beam from a welded part, and automatically adjust a focal point based on the intensity of the reflected laser beam.

Further, JP 5100833 B discloses a laser processing device and a laser processing method intended to detect a timing of processing termination of a pierce hole by using a reflected beam, switch piercing to cutting based on the detection result, and effectively carry out the laser processing while reducing a processing defect.

FIG. 9 explains a state in which a laser beam is irradiated to an article to be processed in a laser processing device of the prior art. The laser beam from a processing head 100 such as an optical fiber is condensed by a light condense optical system (or an optical lens) 102, and is generally vertically irradiated to a surface of an article 106 to be processed, as indicated by an arrow 104. In this regard, when article 106 is a metal material such as steel or aluminum, since the laser beam is easily reflected, a part of the irradiated laser beam is reflected at an irradiation point 110 so as to reversely progress along a path similar to the outward path, and then the part of the laser beam is returned to processing head 100 as the reflected light, as shown by an arrow 108, whereby a laser light source, etc., may be damaged. As such, due to the reflected laser beam returned to the laser oscillator, the laser power cannot be controlled and/or the optical system may be damaged. As a relevant prior art document for avoiding such a problem, JP S62-289387 A discloses a technique to incline at least one of an irradiation head and a reflecting material, so that an optical axis of an irradiated laser beam is not aligned with an optical axis of a reflected laser beam.

As described above, in case that the article to be processed is a metal material such as steel or aluminum, by which the laser beam is easily to be reflected, or that an energy density at a processing point is relatively low, when a light condensing point is positioned on a surface of the article, the part of the irradiated laser beam may reversely progress along the path similar to the outward path so as to be returned to the laser light source as the reflected light. Since the amount (or intensity) of the reflected light is high, the laser light source or the beam path of the laser processing device may be increased.

The device of JP 3154176 B or JP 5100833 B includes a means for detecting the reflected laser beam, but does not include a means for reducing or eliminating an adverse effect of the reflected laser beam on the laser light source, etc. On the other hand, in JP S62-289387 A, at least one of the irradiation head and the reflecting material is inclined so as to avoid the adverse effect of the reflected laser beam. However, when the laser beam is obliquely irradiated to the surface of the article, the quality of the laser processing may be deteriorated, compared to a case in which the laser beam is generally vertically irradiated to the article.

SUMMARY OF THE INVENTION

An object of the present invention is to provide a laser processing device configured to carry out laser processing by generally vertically irradiating a laser beam to an article to be processed, and having a function for reducing or eliminating an adverse effect due to a reflected laser beam from the article.

Accordingly, one aspect of the present invention provides a laser processing device configured to transmit a laser beam toward a processing head, condense the laser beam by a light condense optical system, and carry out laser processing by generally vertically irradiating the condensed laser beam to an article to be processed, the laser processing device comprising: a light condensing point moving part configured to move a position of a light condensing point of the condensed laser beam from a point separated from a surface of the article in a vertical direction to the surface of the article, while irradiating the laser beam; and a light condensing point distance setting part configured to set a light condensing point distance which corresponds to a distance between the light condensing point and the surface of the article when the laser beam is started to be irradiated, wherein the light condensing point distance is set so that an amount of the laser beam reflected by the surface of the article and returned to a laser light source through the light condense optical system is not more than an allowable value.

In a preferred embodiment, the light condensing point distance is previously calculated or experimentally determined based on a relationship among a reflection ratio of the article, an area of a laser beam irradiating part, an area of the reflected laser beam on the laser beam irradiating part, and a laser power. In this case, it is preferable that the laser beam irradiating part be an irradiating end of an optical fiber. Further, it is preferable that the light condensing point distance be set so that both an amount of a reflected laser beam returned to a core of the optical fiber and an amount of a reflected laser beam returned to a clad of the optical fiber are not more than respective allowable values.

In a preferred embodiment, the light condensing point moving part is configured to move an optical component of the light condense optical system in a direction of an optical axis.

In a preferred embodiment, the light condensing point moving part is configured to move the processing head including the light condense optical system in a direction of an optical axis. In this case, the laser processing device may further comprise: a pass point setting part configured to set a pass point positioned above a position of the processing head corresponding to the light condensing point distance where the laser beam is started to be irradiated, when the processing head is moved toward a next processing start point in a processing program for executing a series of laser processing; and a path generating part configured to generate a path extending through the pass point and the position of the processing head.

In a preferred embodiment, the laser processing device further comprises a movement velocity limiting part configured to limit a movement velocity of the processing head to a predetermined velocity, after the processing head reaches the position corresponding to the light condensing point distance.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 5a is a schematic view of a configuration for moving the light condensing point by moving the processing head;

FIG. 5b is a view showing a state in which a mechanical switch is activated by downwardly moving the processing head;

FIG. 5c is a view showing a state in which the processing head is further downwardly moved;

DETAILED DESCRIPTION

Figure 1:
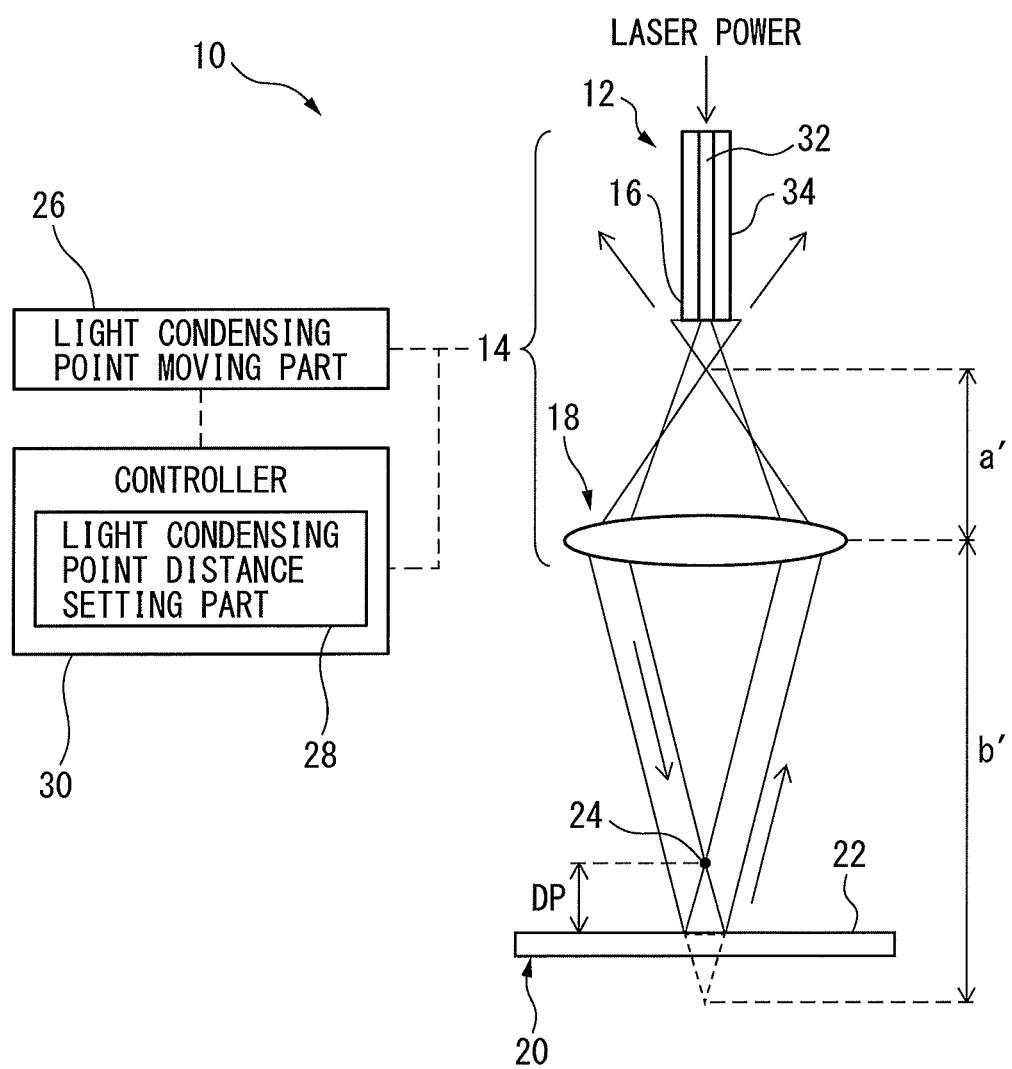
FIG. 1 is a view explaining laser processing performed by using a laser processing device according to a preferred embodiment of the present invention, in which a light condensing point is upwardly moved away from a surface of a workpiece.
Figure 2:
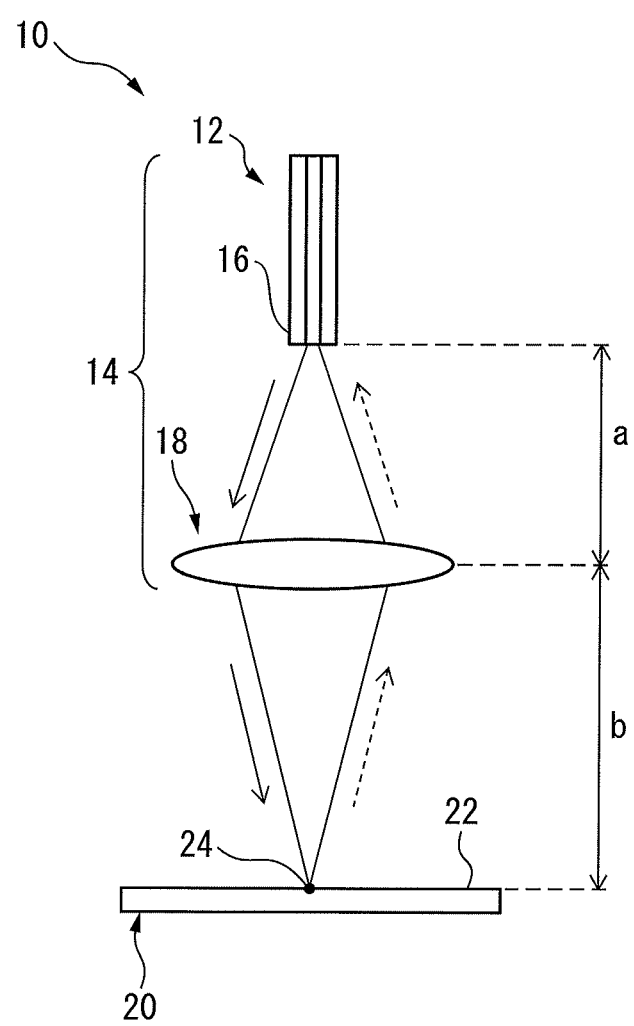
FIG. 2 is view explaining the laser processing performed by using the laser processing device according to the preferred embodiment of the present invention, in which the light condensing point is positioned on the surface of the workpiece.

FIGS. 1 and 2 explain laser processing carried out by using a laser processing device according to a preferred embodiment of the present invention. Laser processing device 10 is configured to transmit a laser beam toward a processing head 14 by using an optical fiber 12, etc., condense the laser beam irradiated from a laser irradiating part (in the illustrated embodiment, an irradiating end of the optical fiber) 16 by a light condense optical system (optical lens) 18, and carry out predetermined laser processing, such as cutting, welding or marking, by generally vertically irradiating the condensed laser beam to a surface 22 of an article or workpiece 20 to be processed.

Laser processing device 10 includes: a light condensing point moving part 26, such as a drive axis, configured to move a position of a light condensing point (focal point) 24 of the laser beam in a direction of an optical axis, while irradiating the laser beam, by moving at least one of processing head 14, an optical component (explained below) of light condense optical system 18, and workpiece 20; and a light condensing point distance setting part 28, such as a central processing unit (CPU), configured to set a light condensing point distance DP which corresponds to a distance between light condensing point 24 and a surface 22 of workpiece 20 when the laser beam is started to be irradiated, wherein light condensing point distance DP is set so that an amount of the laser beam reflected by workpiece surface 22 and returned to processing head 14 (or a laser light source) through light condense optical system 18 is not more than an allowable value.

In the working example of FIG. 1, the motion of light condensing point moving part 26 may be controlled by a controller for controlling the motion and/or process in laser processing device 10, and the function of light condensing point distance setting part 28 may be also provided to controller 30. However, light condensing point distance setting part 28 may be constituted as another device, such as a personal computer, which is separated from controller 30. In addition, in FIG. 2, the components other than processing head 14, light condense optical system 18 and workpiece 20 are omitted.

Figure 9:
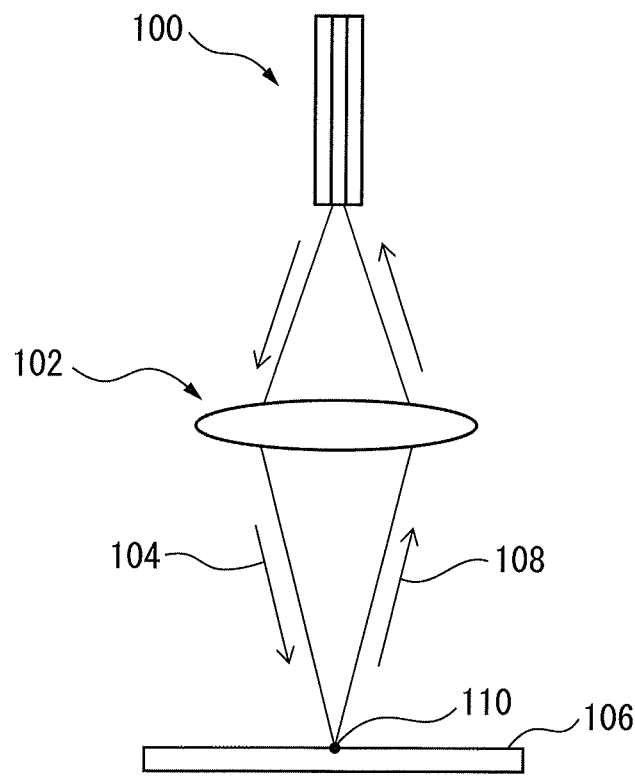
FIG. 9 is a view showing a state in which a laser beam is irradiated on an article to be processed in a conventional laser processing device.

As shown in FIG. 1, processing head 14 starts to irradiate the laser beam from a position where is upwardly and vertically separated from workpiece surface 22 by light condensing point distance DP. In this regard, apparent from the comparison between FIGS. 1 and 9, due to a change in the optical positional relationship, an amount of laser beam (or light flux) reflected by workpiece surface 22 and returned to irradiating end 16 of the optical fiber is decreased. Concretely, an area of the reflected laser beam (in the generally horizontal cross-section) at the position of irradiating end 16 of the optical fiber is larger than an area of irradiating end 16 of the optical fiber. Therefore, in the state of FIG. 1, the amount of laser beam returned to the laser light source is smaller than the prior art.

From the state of FIG. 1, processing head 14 gradually moves so that the position of light condensing point 24 approaches workpiece surface 22, while irradiating the laser beam. As a result, light condensing point 24 is positioned on workpiece surface 22 as shown in FIG. 2. Although the optical positional relationship of FIG. 2 is substantially the same as FIG. 9, a certain amount of laser beam has been irradiated on workpiece surface 22 from the state of FIG. 1 to the state of FIG. 2, and thus a property and/or a beam reflection ratio of a portion of workpiece surface 22 to which the laser beam is irradiated is changed due to melting of the portion, etc. Therefore, the amount of laser beam returned to irradiating end 16 of the optical fiber is smaller than that of FIG. 9. Accordingly, in the embodiment, workpiece 20 can be heated from when the light condensing point is positioned so that the amount of the reflected laser beam returned to the irradiating end or the laser light source is relatively small, so as to change the property of workpiece surface 22 due to the melting, etc. Simultaneously, light condensing point 24 can be moved toward workpiece surface 22, so as to start the laser processing while limiting the amount of the reflected laser beam returned to the irradiating end. Once the laser processing is started, the melted and transmuted processing point of the workpiece can continue to absorb the laser beam, whereby the laser processing such as cutting, welding or marking, etc., can be continuously carried out.

In this regard, a focal length "f" of light condense optical system 18 can be calculated by following equation (1), using dimensions "a'" and "b'" of FIG. 1 or dimensions "a" and "b" of FIG. 2.

$$1/f = 1/a' + 1/b' = 1/a + 1/b \quad (1)$$

As explained above, light condensing point distance DP, at which the laser beam is started to be irradiated, is set to a distance so that the amount of the laser beam reflected by workpiece surface 22 and returned to the laser light source (or laser beam irradiating end 16) through light condense optical system 18 is not more than the predetermined allowable value. Concretely, light condensing point distance DP may be previously calculated or experimentally determined based on a relationship among the reflection ratio of workpiece surface 22, the area of laser beam irradiating part 16, the area of the reflected laser beam on laser beam irradiating part 16, and the laser power. In this regard, a light flux $\Phi$ of the reflected laser beam toward laser beam irradiating part 16 can be represented by following equation (2), using laser power W, reflection ratio R of workpiece surface 22, area A1 of laser beam irradiating part 16, and area A2 of the reflected laser beam at the position of laser beam irradiating end 16.

$$\Phi = W \times R \times A1/A2 \quad (2)$$

Area A2 of the reflected laser beam can be measured or calculated from focal length f of light condense optical system 18 and light condensing point distance DP. Therefore, by setting an allowable value of light flux $\Phi$ to a first value so that the laser beam is not damaged, or a second value obtained by adding a certain margin to the first value, appropriate light condensing point distance DP can be calculated or set.

As shown in FIG. 1, when laser beam irradiating part 16 is the irradiating end of the optical fiber, it is preferable that light condensing point distance DP be set so that both an amount (or a light flux) of a reflected laser beam returned to a core 32 of optical fiber 12 and an amount (or a light flux) of a reflected laser beam returned to a clad 34 of optical fiber 12 are not more than respective allowable values. By virtue of this, a fiber laser oscillator and an optical system of the laser processing device can be assuredly protected from the reflected laser beam.

When the light condensing point distance should be experimentally determined, the laser beam irradiation may be performed at a small laser power or for a short time, and then the distance may be calculated based on a measurement value obtained as a result of the laser irradiation. Further, such measurement and calculation may be automatically performed before the actual processing is carried out, and then the light condensing point distance at which the laser beam is started to be irradiated may be automatically calculated and set.

Figure 3:
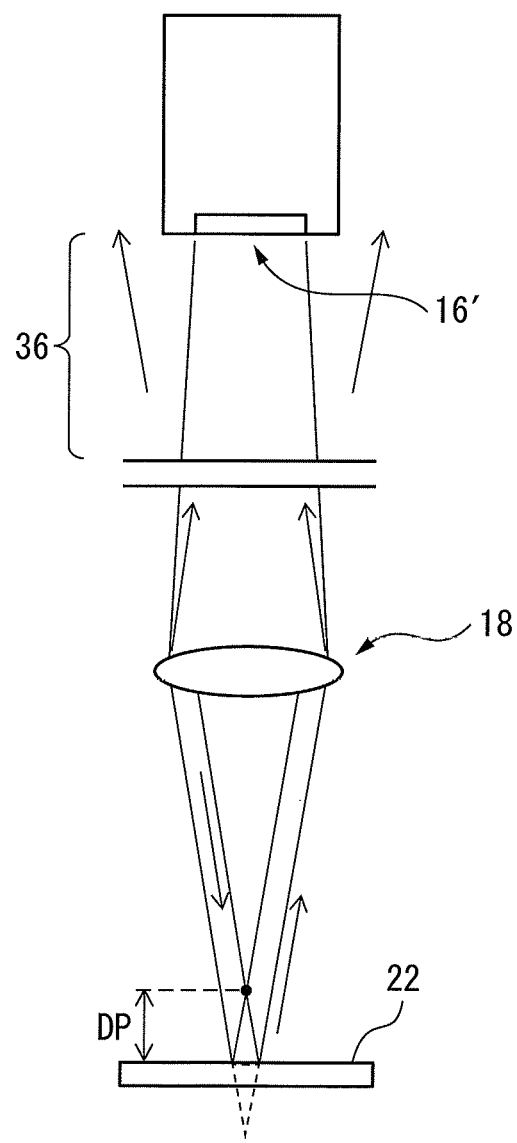
FIG. 3 is a schematic view around a processing head of the laser processing device when the laser processing device is an optical space transmission type.

FIG. 3 is a schematic view of the processing head when the laser processing device is a carbon dioxide laser. In the working example of FIG. 3, the laser beam from laser beam irradiating part 16' is transmitted through a transmission space 36, is condensed by light condense optical system 18, and then is irradiated to workpiece surface 22. At this point, by setting light condensing point distance DP as explained above, the light flux of the reflected laser beam returned to laser beam irradiating part 16' can be reduced. As such, the present invention can also be applied to the laser processing device when the device is the optical space transmission type.

Figure 4:
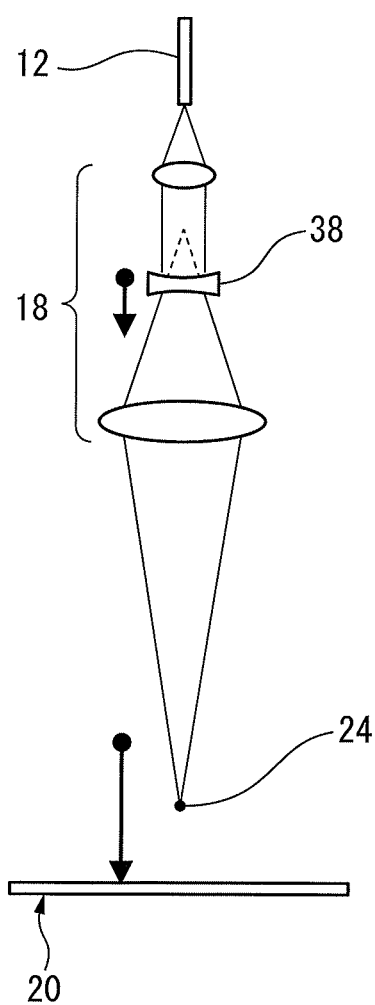
FIG. 4 is a schematic view of a configuration for moving the light condensing point by moving an optical component of a light condense optical system.

FIG. 4 is an example of a schematic configuration, in which light condensing point moving part 26 as explained above is configured to move the light condensing point by moving an optical component of light condense optical system 18. In the working example of FIG. 4, light condense optical system 18 has a concave lens 38 as the optical component. When light condensing point moving part 26 moves concave lens 38 in the direction of the optical axis, the position of light condensing point 24 can be changed. Apparent from FIG. 4, an amount of movement of concave lens 38 may be larger than an amount of movement of light condensing point 24. Therefore, depending on the design of the light condense optical system, the position of light condensing point can be moved at high speed. Further, in this method, the laser beam may be irradiated while moving the processing head so that the light condensing point approaches in the vicinity of the workpiece surface from below the workpiece surface. By virtue of this, when another optical component exists between the laser light source and the light condense optical system, the optical component can be prevented from being damaged due to another light condensing point occurred on the optical component, for example.

FIGS. 5a to 5c show a schematic configuration, as an alternative example of FIG. 4, in which light condensing point moving part 26 is configured to move the light condensing point by moving processing head 14 including light condense optical system 18. In the example of FIGS. 5a to 5c, the position of the light condensing point can be changed by moving a whole of processing head 14 including light condense optical system 18 by light condensing point moving part 26. In this example, the movement of processing head 14 for changing the position of the light condensing point can be carried out along with the approach motion or the retreat motion of processing head 14 relative to workpiece 20. Further, in this example, light condensing point distance setting part 28 is constituted as a mechanical switch.

Figure 6:
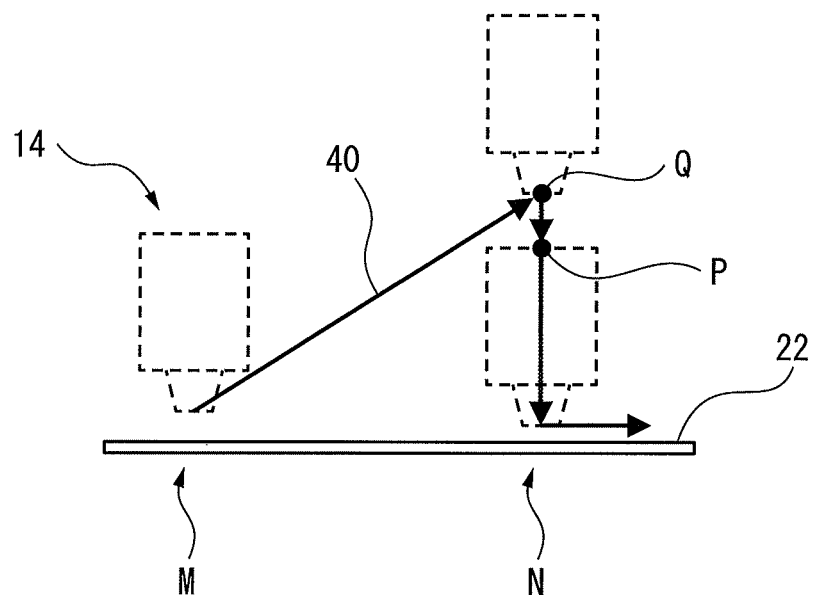
FIG. 6 is a view explaining an example in which a pass point is set above the position of the processing head corresponding to a light condensing point distance, when a series of laser processing is carried out.

FIG. 6 is a view explaining an example in which a pass point is set above the position of the processing head corresponding to light condensing point distance DP, when the processing head moves toward the next processing tart point after the processing of a certain portion is completed, during a series of laser processing is carried out. In detail, when the laser processing of portion M of workpiece 20 is completed and then processing head 14 is to be moved to next processing start point N, pass point Q is set or determined above the position of processing head 14 corresponding to light condensing point distance DP in the direction of the optical axis, so that (a representative point of) processing head 14 passes through pass point Q before next processing point N. A path including determined pass point Q may be generated in the processing program. In the example of FIG. 6, the path from portion M to pass point Q is a straight line, and thus the processing time can be reduced.

Figure 7:
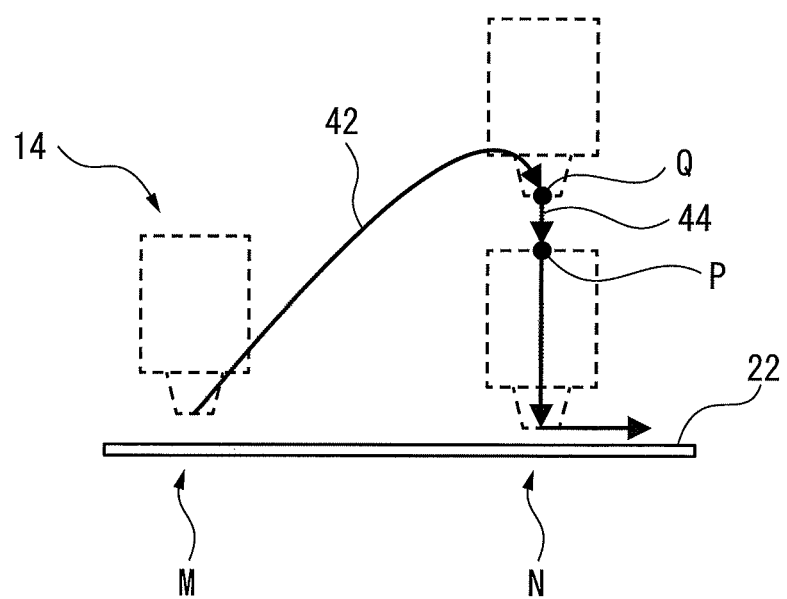
FIG. 7 is a view explaining another example in which a pass point is set above the position of the processing head corresponding to a light condensing point distance, when a series of laser processing is carried out.

FIG. 7 is a view explaining another example, as an alternative example of FIG. 6, in which a pass point is set above the position of the processing head corresponding to light condensing point distance DP, when the processing head moves toward the next processing tart point after the processing of a certain portion is completed, during a series of laser processing is carried out. In detail, when the laser processing of portion M of workpiece 20 is completed and then processing head 14 is to be moved to next processing start point N, pass point Q is set or determined above the position of processing head 14 corresponding to light condensing point distance DP in the direction of the optical axis, so that (a representative point of) processing head 14 passes through pass point Q before next processing point N. A path including determined pass point Q may be set or generated in the processing program. In the example of FIG. 7, the path from portion M to pass point Q is a curved line, and curved line 42 is continuously connected to a straight line 44 extending from pass point Q to position P of the processing head so that processing head 14 is not suddenly accelerated or decelerated. By virtue of this, the processing time can be reduced to a certain degree, and an impact due to the sudden acceleration or deceleration can be prevented from being applied to processing head 14.

In either of FIG. 6 or 7, after the laser processing is started from processing start point N, a keyhole is generated on workpiece surface 22 and/or workpiece surface 22 is roughened. Therefore, the amount of the reflected laser beam returned to processing head is relatively low, and thus the laser processing can be stably performed. The function or means for setting pass point Q and generating the path as described in FIG. 6 or 7 may be provided as a CPU, etc., to controller 30 of FIG. 1. Alternatively, the pass point setting means (part) and the path generating means (part) may be constituted as a device such as a personal computer, which is separate from controller 30.

Figure 8:
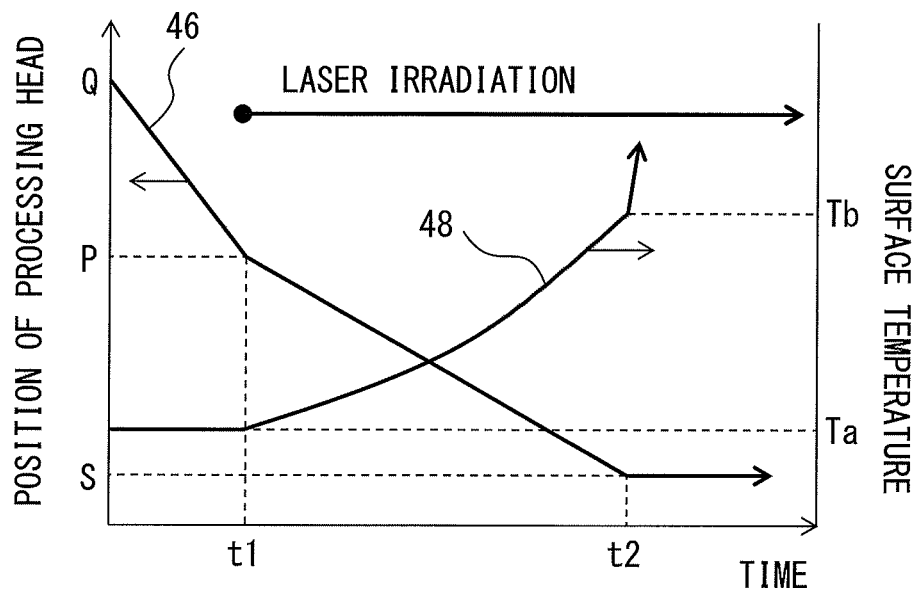
FIG. 8 is a graph explaining an example in which a movement velocity of the processing head from the position of the processing head corresponding to the light condensing point distance is limited.

FIG. 8 is a graph explaining an example in which a movement velocity of processing head 14 from position P of the processing head corresponding to light condensing point distance DP is limited not more than a predetermined velocity. In detail, as indicated by a graph 46 of FIG. 8, from a position before position P of the processing head (corresponding to light condensing point distance DP) to position P (time point t1), processing head 14 is moved at a relatively high first velocity, and then, from position P to position S (time point t2) of the processing head corresponding to the state of FIG. 2, processing head 14 is moved at a second velocity lower than the first velocity. Such a function or means for limiting the movement velocity of the processing head may be provided as a CPU, etc., to controller 30 of FIG. 1. Alternatively, the movement velocity limiting means (part) may be constituted as a device such as a personal computer, which is separate from controller 30. Otherwise, a mechanical switch as described in FIGS. 5*a* to 5*c* may be used so as to limit the movement velocity of the processing head to the predetermined velocity by using a signal from the mechanical switch.

In general, from when workpiece 20 is started to be heated by the laser, it takes some time to melt or change the property of workpiece surface 22. Therefore, in the example of FIG. 8, by limiting the movement velocity of the processing head from position P where the laser irradiation is started, the time for melting workpiece surface 22 (from t1 to t2 in this case) can be obtained.

The process when using the configuration as shown in FIGS. 5*a* to 5*c* will be explained. First, as shown in FIG. 5*a*, processing head 14 approaches workpiece 20 at the high velocity, and the laser beam is not irradiated in this state. Next, as shown in FIG. 5*b*, when processing head 14 reaches position P, a cam 47 arranged on to processing head 14 activates (OFF→ON) the mechanical switch (or light condensing point distance setting part 28), whereby signals are transmitted from the mechanical switch to the laser light source and light condensing point moving part 26. By receiving the signal, the laser irradiation is started by the laser light source, and the movement velocity of processing head 14 is limited to the predetermined velocity. In this state, although a certain amount of laser beam is reflected by workpiece surface 22, the laser light source is not damaged or broken due to such amount of the reflected laser beam. Further, as shown in FIG. 5*c*, when the position of the light condensing point generally coincides with workpiece surface 22, workpiece surface 22 is sufficiently heated. As a result, workpiece surface 22 can sufficiently absorb the laser beam due to the change in the shape and the property of workpiece surface 22, and then the laser processing such as cutting or welding is started.

In the example of FIG. 8, a pattern of the limitation of the movement velocity of processing head 14 may be predetermined based on an experimental value, etc. In this regard, as indicated by a graph 48 representing the surface temperature of the workpiece at the center of the laser irradiating point, it is referable that the pattern be determined so that the surface temperature of the workpiece is increased from normal temperature Ta to temperature Tb at which the property of the workpiece surface is changed, during processing head 14 is moved from position P to position S.

In the above embodiment, the laser processing device is a fiber laser using an optical fiber. However, the present invention is not as such, for example, may be applied to a direct diode laser (DDL) or a carbon dioxide laser. In this regard, the present invention is particularly advantageous when being applied to the laser processing device having the optical fiber.

According to the present invention, the article to be processed can be started to be heated when the light condensing point is positioned so that the amount of the reflected laser beam returned to the laser light source and the laser path is low, and then the processing head approaches the article while changing the property of the surface of the object. Therefore, the laser processing can be started while avoiding the adverse effect due to the reflected laser beam.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser processing device configured to transmit a laser beam toward a processing head, condense the laser beam by a light condense optical system, and carry out laser processing by vertically irradiating the condensed laser beam to an article to be processed, the laser processing device comprising:
    a processor configured to:
        prior to the laser starting irradiation, set a light condensing point distance between a light condensing point of the laser beam and a surface of the article, so that the light condensing point of the laser beam is separated from the surface of the article when the laser beam starts irradiation, and
        after starting irradiation and processing of the surface of the article at the set light condensing point separated from the surface of the article, move the light condensing point from the point separated from a surface of the article to the surface of the article, while irradiating the laser beam and the processing the surface of the article,
    wherein the light condensing point distance is computed, prior to the laser starting irradiation, so that an amount of the laser beam reflected by the surface of the article and returned to a laser light source through the light condense optical system is not more than an allowable value when the laser beam starts the irradiation and the processing of the surface of the article;

a movement velocity limiting part configured to limit a movement velocity of the processing head to a predetermined velocity, after the processing head reaches the position corresponding to the light condensing point distance; and wherein the processor is further configured to move, at a predetermined velocity, the light condensing point from the point separated from a surface of the article to the surface of the article while irradiating the laser beam, the predetermined velocity is set to ensure that the surface of the article is irradiated for a time period required to melt the surface of the workpiece.

2. The laser processing device as set forth in claim 1, wherein the light condensing point distance is previously determined based on a relationship among a reflection ratio of the article, an area of a laser beam irradiating part, an area of the reflected laser beam on the laser beam irradiating part, and a laser power.

3. The laser processing device as set forth in claim 2, wherein the laser beam irradiating part is an irradiating end of an optical fiber.

4. The laser processing device as set forth in claim 3, wherein the light condensing point distance is set so that both an amount of a reflected laser beam returned to a core of the optical fiber and an amount of a reflected laser beam returned to a clad of the optical fiber are not more than respective allowable values.

5. The laser processing device as set forth in claim 1, wherein a light condensing point moving part is configured to move an optical component of the light condense optical system in a direction of an optical axis.

6. The laser processing device as set forth in claim 1, wherein a light condensing point moving part is configured to move the processing head including the light condense optical system in a direction of an optical axis.

7. The laser processing device as set forth in claim 6, further comprising:

a pass point setting part configured to set a pass point positioned above a position of the processing head corresponding to the light condensing point distance where the laser beam is started to be irradiated, when the processing head is moved toward a next processing start point in a processing program for executing a series of laser processing; and a path generating part configured to generate a path extending through the pass point and the position of the processing head.

8. The laser processing device as set forth in claim 1, wherein the light condensing point distance is set so that a property of the surface of the workpiece surface is changed due to the laser beam irradiated to the surface of the workpiece when the light condensing point reaches the surface of the workpiece.

\* \* \* \* \*